United States Patent [19]
Ferguson

[11] 3,875,405
[45] Apr. 1, 1975

[54] NOVEL NAVIGATIONAL COMPUTER AND MAP TRACKING DRIVE

[76] Inventor: Dennis Ferguson, 170 Evergreen Rd., Edison, N.J. 00817

[22] Filed: Feb. 22, 1974

[21] Appl. No.: 444,811

Related U.S. Application Data

[63] Continuation-in-part of Ser. No. 280,592, Aug. 14, 1972, abandoned, which is a continuation-in-part of Ser. No. 26,891, April 9, 1970, abandoned.

[52] U.S. Cl...... 250/211 R, 235/150.2, 235/150.27, 250/231 SE
[51] Int. Cl....... G01d 5/34, G06f 15/50, G06g 7/70
[58] Field of Search.................. 235/150.2, 150.27; 250/203, 211 K, 235, 211 R, 237 R, 231 SE

[56] References Cited
UNITED STATES PATENTS 3,206,719  9/1965  Pure .............................. 250/237 R
3,582,626  6/1971  Stansbury ...................... 235/150.2
3,588,478  6/1971  Anthony ....................... 235/150.27

OTHER PUBLICATIONS

Walker, R. C., "Automatic Map Tracing," Photoelectric Cells in Industry, pp. 238–240, Pitman Publishing Co., New York, N.Y., 1948.
Strother, J. A., "Angular Position Sensor," RCA Technical Notes, TN Number 834, p. 1, May, 1969.

*Primary Examiner*—James W. Lawrence
*Assistant Examiner*—T. N. Grigsby
*Attorney, Agent, or Firm*—Auslander & Thomas

[57] ABSTRACT

A navigational computer has light-sensitive cells occludable in proportion to a series of angle functions to give an output in proportion to an actual angle heading so that a track may be made in proportion to a heading and a velocity when the computer receives a velocity input.

22 Claims, 19 Drawing Figures

INVENTOR.
DENNIS FERGUSON
BY Auslander + Thomas
ATTORNEYS

INVENTOR.
DENNIS FERGUSON

BY Auslander + Thomas

ATTORNEYS

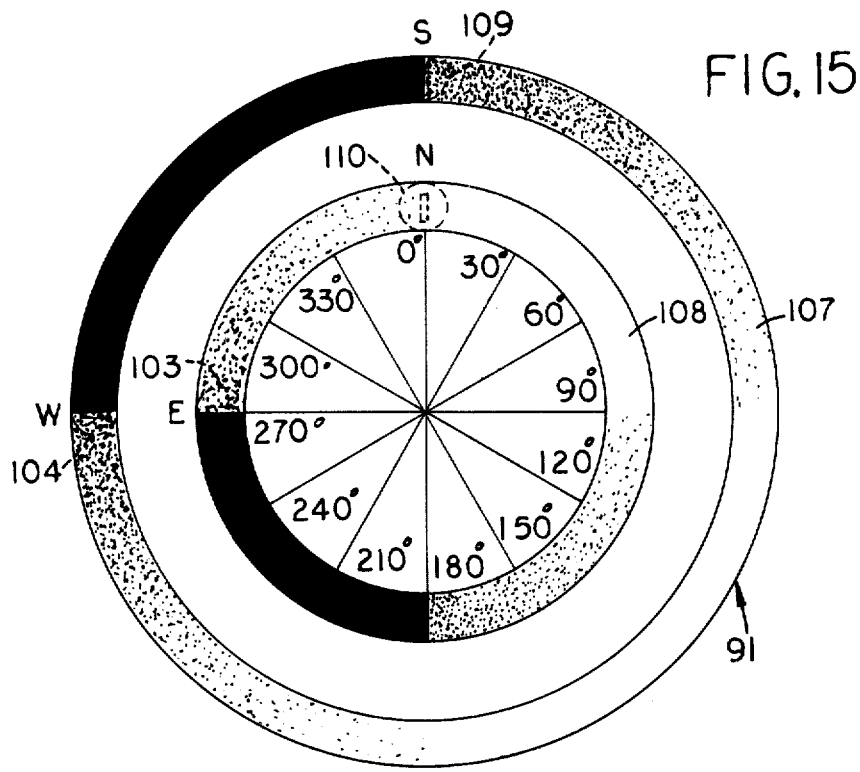
FIG.15
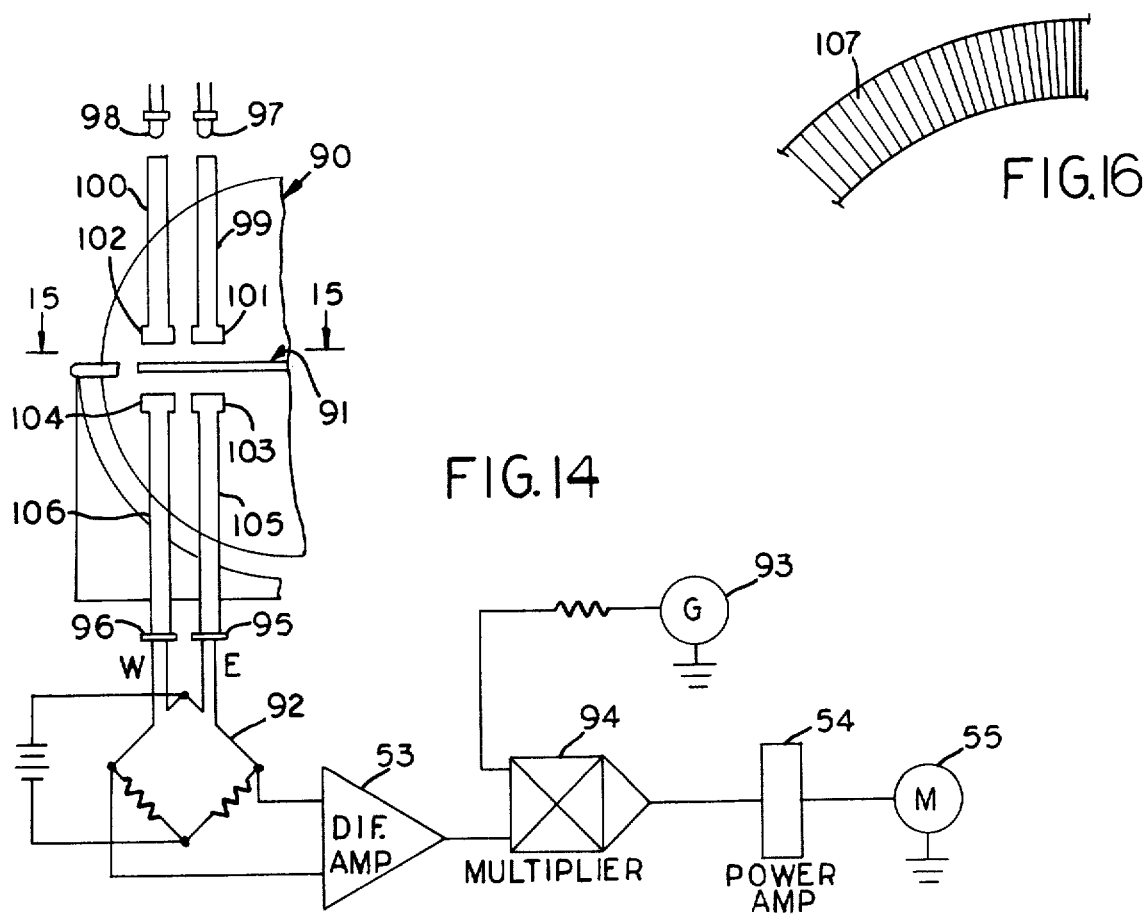
FIG.16
FIG.14

NOVEL NAVIGATIONAL COMPUTER AND MAP TRACKING DRIVE

This is a continuation-in-part application of Ser. No. 280,592, filed Aug. 14, 1972 and now abandoned, which was a continuation-in-part application of Ser. No. 26,891 filed Apr. 9, 1970 and now abandoned.

The present invention relates to a novel navigational computer and map tracking drive.

In the past, innumerable devices have been provided to drive servos based upon an informational input of velocity information and directional information.

Such devices of the past have been used in conjunction with map plotters or track or optical map projection tracking or plotting a velocity and speed across a projection or tracking or plotting using a projection across a curve or fixed point.

Trackers and plotters of the past have usually required an input of velocity and directional information and have achieved their end results by having a readout or orthogonal drives on servos or resolvers to track or plot as desired.

Directional information servo systems and those systems used in tracking and plotting have often used light sensitive systems associated with a compass card. Such systems have been used to keep a ship or plane on a preselected compass course or heading actuated by light diferences caused by compass changes in deviating from the selected heading. Even masked moveable transparencies have given direct signals of a compass heading.

Complicated electromotive force drives have been taken off compass headings in a course plotter or tracker to actuate orthogonal drives to track and plot a speed-directional course resultant. Mechanical linkages as to direction have also been coupled with odometer inputs to track and plot such transit, and complicated devices have been used with moving mirrors, photocells and thyratrons.

Some compass devices of the past actuate signals based upon light occlusion. Other compass devices even have occluded light to actuate signals in linear proportion to indicate compass headings.

According to the present invention, a simple angle function is provided for, a resultant of northing and easting components of a tracking or plotting drive. The output of such computer is combined with a linear velocity input to track or plot a course of travel.

As exemplified in the drawings, the velocity input may be a light intensity generated in proportion to a travel velocity. The exemplified output is a projected map tracking along a fiducial point.

Where, as shown in the exemplification of the present invention, a series of maps may be projected one at a time, it is contemplatable that as applied to the polyconical projection of the ordinary road map, that for the distances traveled, the projected deviation from the compass heading may usually be overlooked and adjustment made manually when desired, or at such time as new maps are changed into the projected system to compensate for any projection deviation.

Any velocity at a particular heading may be resolved into components such as northing and easting, which may be applied to orthogonal drives of a plotting and-/or tracking mechanism. The resultant of the velocity and heading components on each of the orthogonal drives tracks a true angle $\theta$, or a true directional heading in a tracking or plotting mechanism, at a true velocity, all depending upon the informational input. By one analysis, the north-south components follow the formula V co-sine H and the east-west components follow the formula V since H, where V is velocity and H is actual heading. The heading may sometimes be referred to as the angle $\theta$.

In the present invention, the directional input is obtained from a light-selective cell, sensitive to a compass or compasses interacting with an occludable light source. The compass needle card is associated with a moveable shaded area which exposes a light-sensitive cell or cells in proportion to the trigonometric angle function of the directional component of the heading. The velocity component may be applied as exemplified by a light intensity in proportion to the velocity. Other velocity input may be employed such as an odometer. Velocity input coordinates with the directional functions.

Although such novel feature or features believed to be characteristic of the invention are pointed out in the claims, the invention and the manner in which it may be carried out may be further understood by reference to the description following and the accompanying drawings.

FIG. 14 is another embodiment of the present invention.

FIG. 15 is a full plan view of FIG. 14 showing the north seeking discs.

FIG. 16 is a detail of one form of occluding lines for a north seeking disc.

Referring now to the figures in greater detail, where like reference numbers denote like parts in the various figures.

Figure 1:
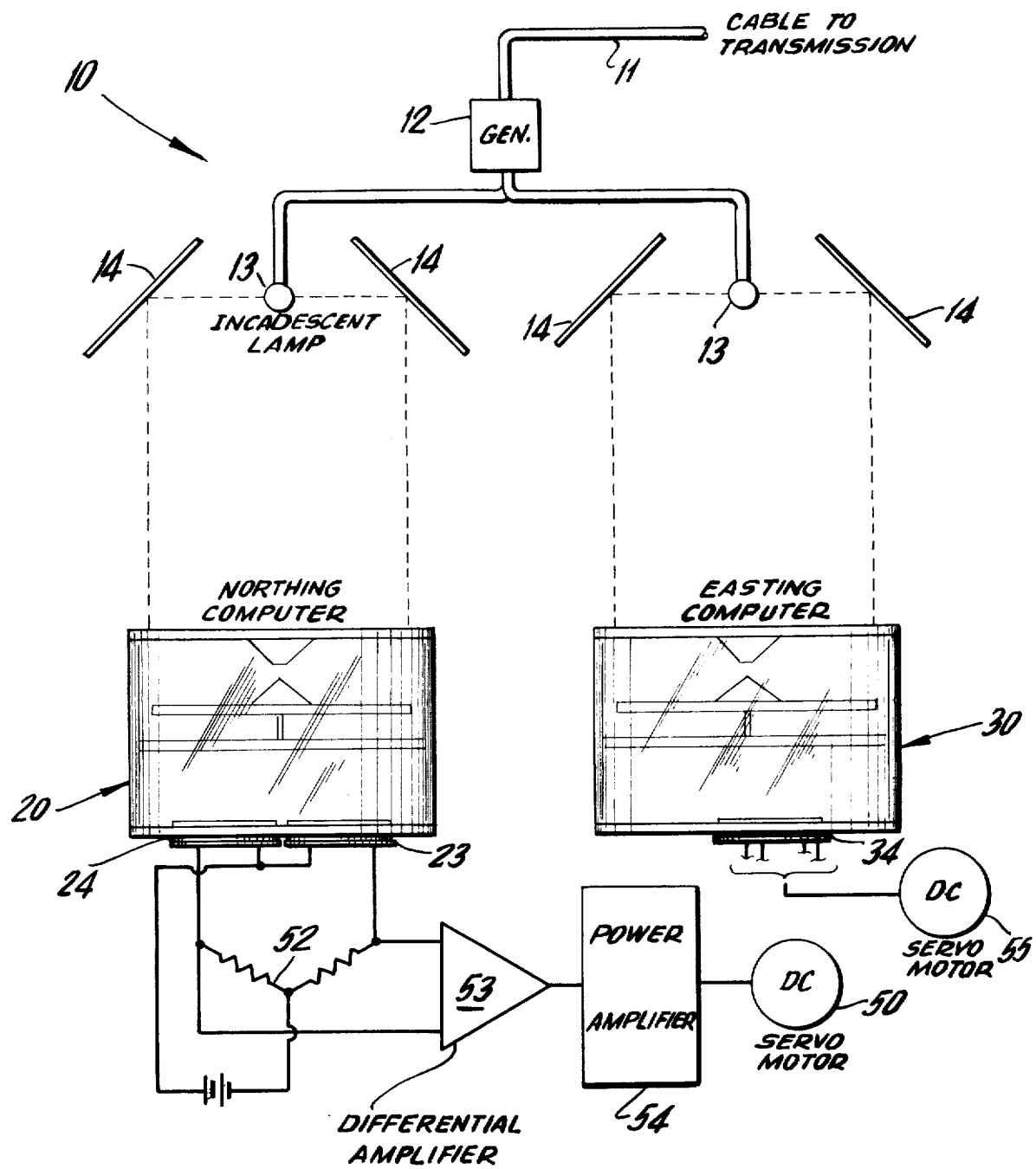
FIG. 1 is a schematic of an embodiment of the navigational computer of the present invention.

The navigational computer 10, as shown in the schematic in FIG. 1, comprises a northing computer 20 and an easting computer 30.

Figures 2, 3:
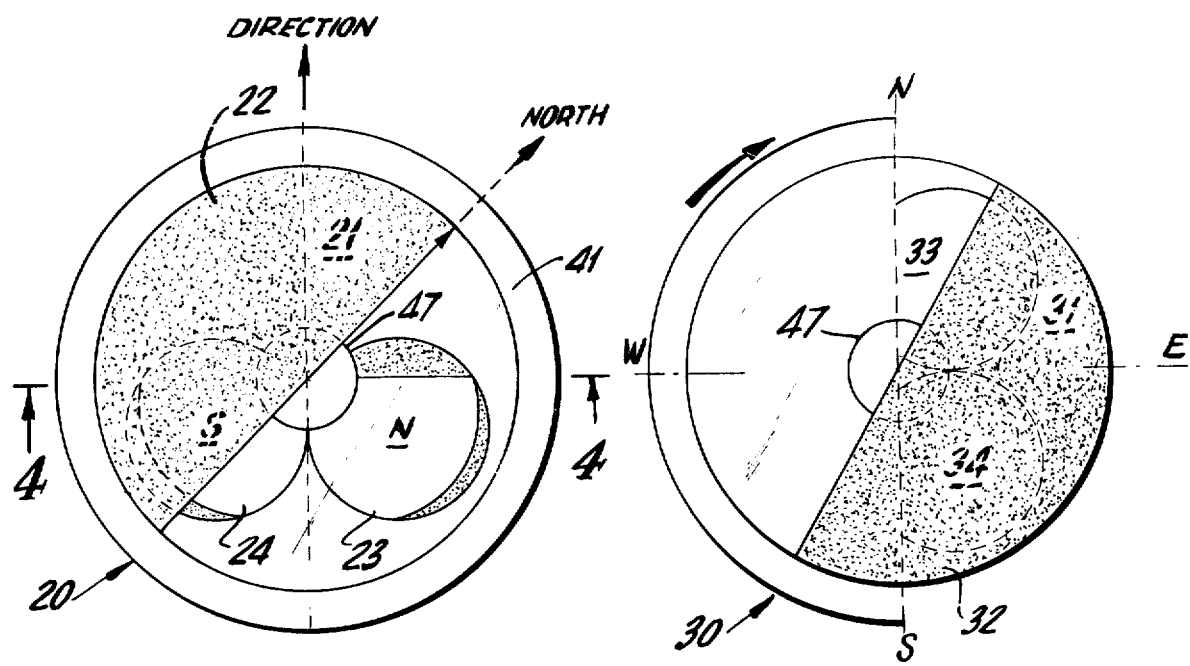
FIG. 2 is a plan view of a north-south vector computer of the present invention.
FIG. 3 is a plan view of an east-west vector computer of the present invention.
Figures 4, 8:
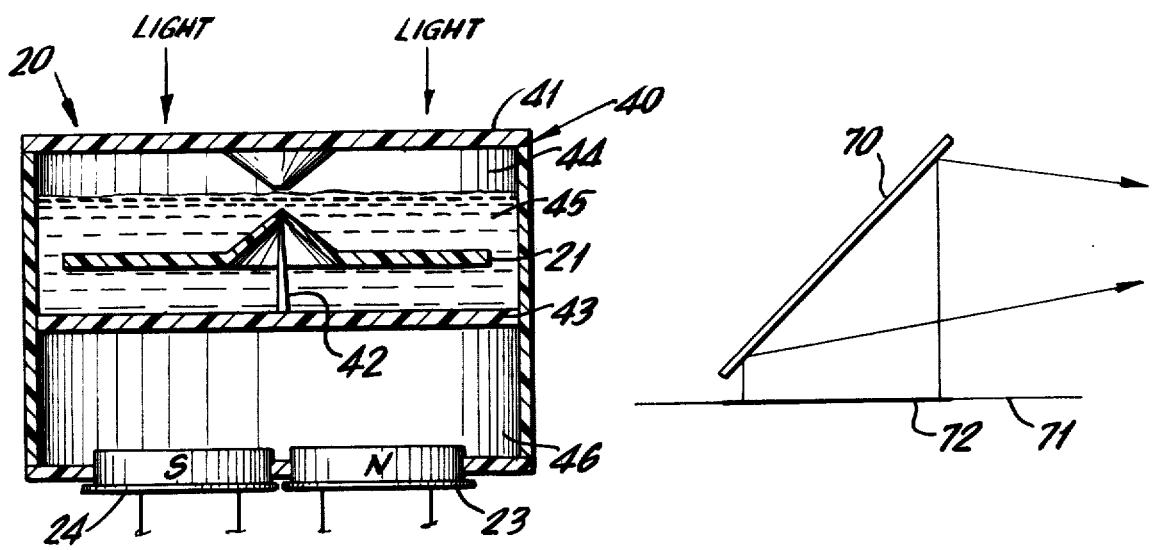
FIG. 4 is a front elevation section of FIG. 2 at lines 4—4.
FIG. 8 is a schematic of the navigational computer of the present invention in a front to front internal projection.

The northing and easting computers 20, 30 as shown in FIGS. 2 and 3, are substantially identical and identical in cross section as shown in FIG. 4, with the exception of the specific differences for computing the different vectors as hereinafter set forth. Each computer 20, 30 has a north-seeking hemispherically occluded disc 21, 31. The disc 21 of the northing computer 20, has an opaque portion 22 extending from 180° to 360°. The easting computer 30 has a similar opaque portion 32 extending from 0° to 180°.

As can be seen in FIG. 4, the northing computer 20 is contained in a binnacle 40, or housing having a transparent top 41. The north seeking disc 21 is suspended on a pivot 42, extending from a watertight transparent base 43. The binnacle compartment 44, in which the disc 21 is suspended, is preferably filled with a fluid 45 to help dampen surge of the disc 21 in the binnacle 40. The lower portion 46 of the binnacle 40 is adapted to hold light-sensitive cells. The binnacle for the easting computer is identical, save for the different positioning of the light-sensitive cells.

Figure 9:
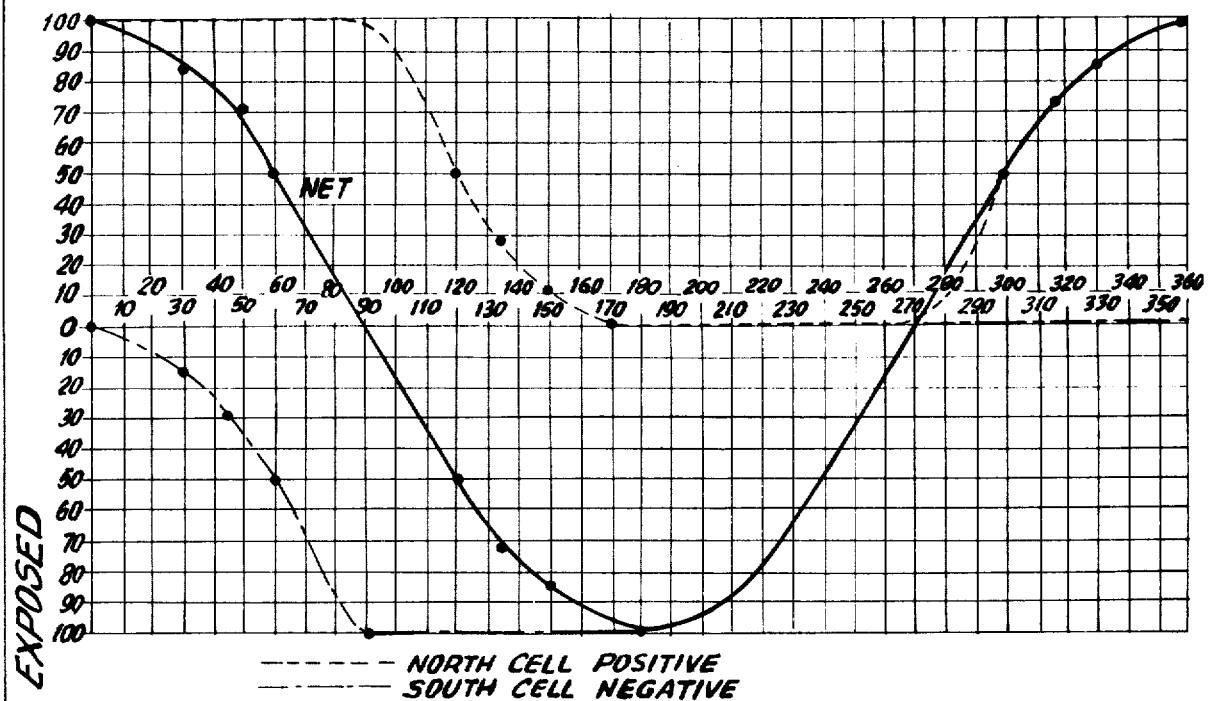
FIG. 9 is a graph of the angle functions on the cells in each computer.
Figure 9:
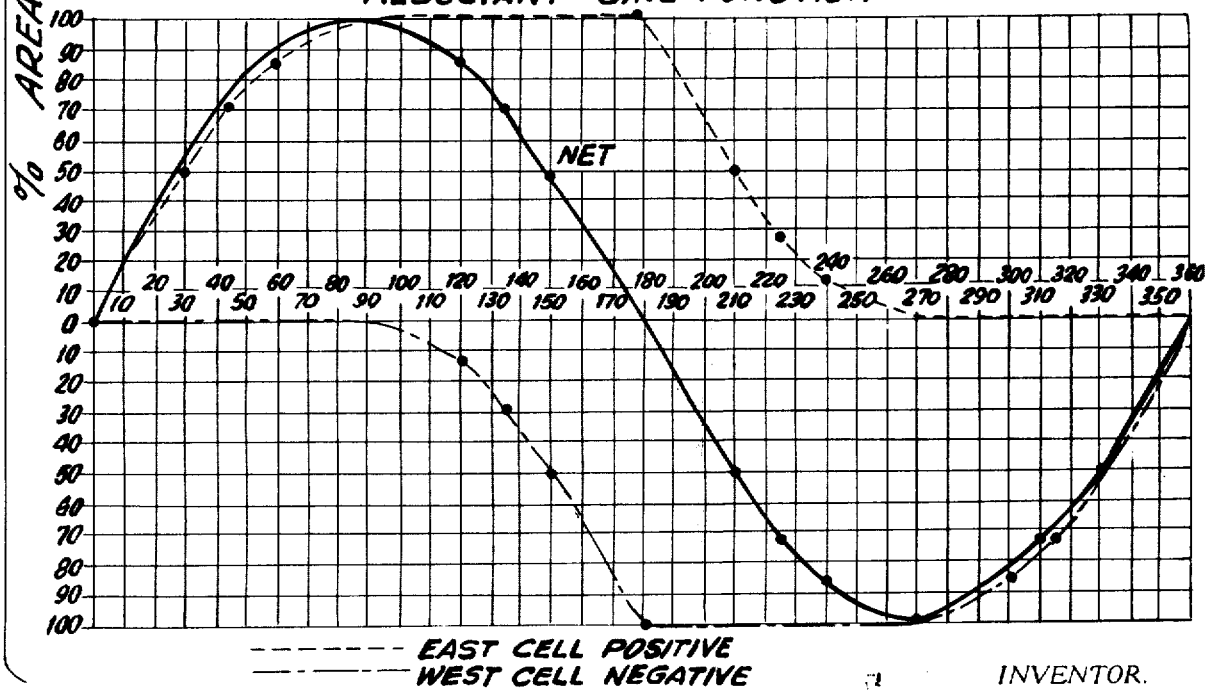
Figure 10:
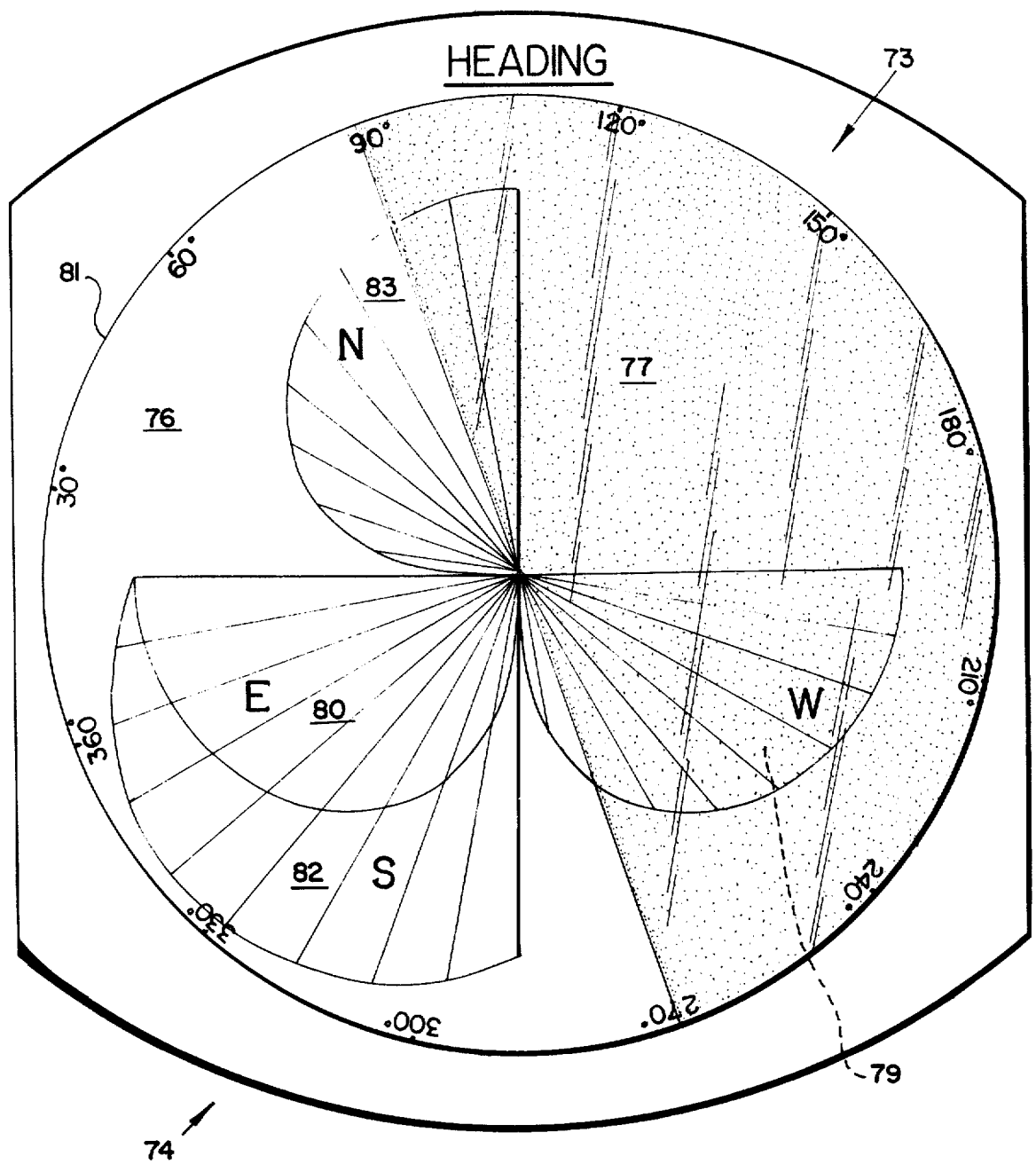
FIG. 10 is a plan view of the computer of the present invention.

The north cell 23 in the northing computer 20, is in the fourth quadrant and has a mathematically positive sign. The south cell 24 is in the third quadrant and has a mathematically negative sign. The easting computer 30 has an east cell 33 in the first quadrant, whose electrical characteristics have a mathematically positive sign, and a west cell 34 in the fourth quadrant has a mathematically negative sign. The north and south cells having positive and negative electrical characteristics, as do the east and west cells 33, 34, interrelate, as can be seen in FIG. 9, to give a resultant angle function equal to the heading H, and having the electrical output of a mathematically negative or positive characteristic associated with the respective sine or co-sine, in each of its circle quadrants, as can be seen in any trigonometric table. Thus, the added functional input of each of the cells 23, 24, 33, 34, gives a resultant reading, either plus or minus, as the case may be, which is a true reading for the angle function for any particular quadrant in which the heading H leaves the cells 23, 24, 33, 34 exposed or occluded. Each cell 23, 24, 33, 34 has an area exposable, free of the opaque portions 22, 32, equal, or in proportion, to the angular function of the northing and easting components of any particular compass heading.

Thus, in the northing computer 20, the north cell 23 has a plus sign in the fourth quadrant and the south cell 24 has a minus sign in the third quadrant. At a compass heading of 30°, the opaque area 22 of the north-seeking disc 21, covers only part of the south cell 24, leaving the entire north cell 23 exposed. A computation of the northing vector V, co-sine H, where V is velocity and H is heading, at 30° angle, gives the resultant co-sine + 0.865. The north cell 23 is fully exposed and has a value of +1. The south cell 24 is designed to have an area equal to the co-sine function of any particular heading, and in this instance, 30°. Since the co-sine function of 30° is − 0.135, the sum of the north and south cells 23, 24 is equal to +0.865. When this +0.865 is subjected to the V factor, the velocity factor, a northing component drive will be applied to the servo 50 in the drive circuit 51 as shown in FIG. 1.

The drive circuit 51 comprises a bridge 52, whose differential output is passed through the differential amplifier 53 to a power amplifier 54, and thus to the servo drive 50.

The easting computer 30 has the same functional relationship and circuitry as the northing computer 20, the details of circuitry of which are not shown in FIG. 1, but only indicated.

At a heading of 30°, the opaque portion 32 of the north-seeking disc 31 of the easting computer 30, leaves the west cell 34 with its mathmatically negative sign completely occluded, and the east cell with a mathematically positive sign, exposing an area equal to the sine of 30°, in this instance, which is + 0.5. Thus, an output from the easting computer gives a plus drive of + 0.5 when the velocity factor is applied.

The cells 23, 24, 33, 34 may be resistive in their output, such as photoelectric cells, or generative in their output, such as solar cells, but in any event, are matched to keep the bridge 52 functional to give out a signal equal to the appropriate angle function, whether mathematically negative or positive, for the appropriate quadrant.

As the compass heading changes, such as to the heading of 45°, the exposed area of the east cell 33 increases, so that approximately+ 0.707 is then the size function and percentage of area-exposed function of the easting computer 30. At the same time, at a heading of 45°, the exposed area of the south cell 24 increases to approximately −0.293, giving a resultant of + 0.707, which is the co-size function of 45°. At 60° the northing computer 20 leaves approximately 0.50 of the areas of the south cell 24 exposed, leaving a result of + 0.50, which is the co-sine of 60°. In the easting computer 30, the east cell 33 leaves an area of approximately + 0.865 exposed, while the west cell 34 is still occluded, giving a + 0.865 area exposed which is equal to the size of 60°.

Set forth below is a chart of representative headings and their sine and co-sine function exposures, negative and positive, as related to each quadrant.

EXPOSURE AND ANGLE FUNCTION CHART

| READING | | CO-SINE | | | SINE | | |
|---|---|---|---|---|---|---|---|
| | | N+ | S− | NET | E+ | W− | NET |
| 0° | N | 1 | 0 | +1 | 0 | 0 | 0 |
| 30° | | 1 | .135 | +.865 | .5 | 0 | +.5 |
| 45° | NE | 1 | .293 | +.707 | .707 | 0 | +.707 |
| 60° | | 1 | .50 | +.5 | .865 | 0 | +.865 |
| 90° | E | 1 | 1 | 0 | 1.0 | 0 | +1.0 |
| 120° | | .5 | 1 | −.5 | 1.0 | .135 | +.865 |
| 135° | SE | .293 | 1 | −.707 | 1.0 | .293 | +.707 |
| 150° | | .35 | 1 | −.865 | 1.0 | .50 | +.50 |
| 180° | S | 0 | 1 | −1 | 1.0 | 1.0 | 0.0 |
| 210° | | 0 | −.865 | −.865 | .5 | 1.0 | −.50 |
| 225° | SW | 0 | −.707 | −.707 | .293 | 1.0 | −.707 |
| 240° | | 0 | −.5 | −.5 | .135 | 1.0 | −.865 |
| 270° | W | 0 | 0 | −0 | 0 | 1.0 | −1.0 |
| 300° | | .5 | 0 | +.5 | 0 | .865 | −.865 |
| 315° | NW | .707 | 0 | +.707 | 0 | .707 | −.707 |
| 330° | | .865 | 0 | +.865 | 0 | .50 | −.50 |
| 360° | N | 1.0 | 0 | +1 | 0 | 0.0 | −0.0 |

Figure 5:
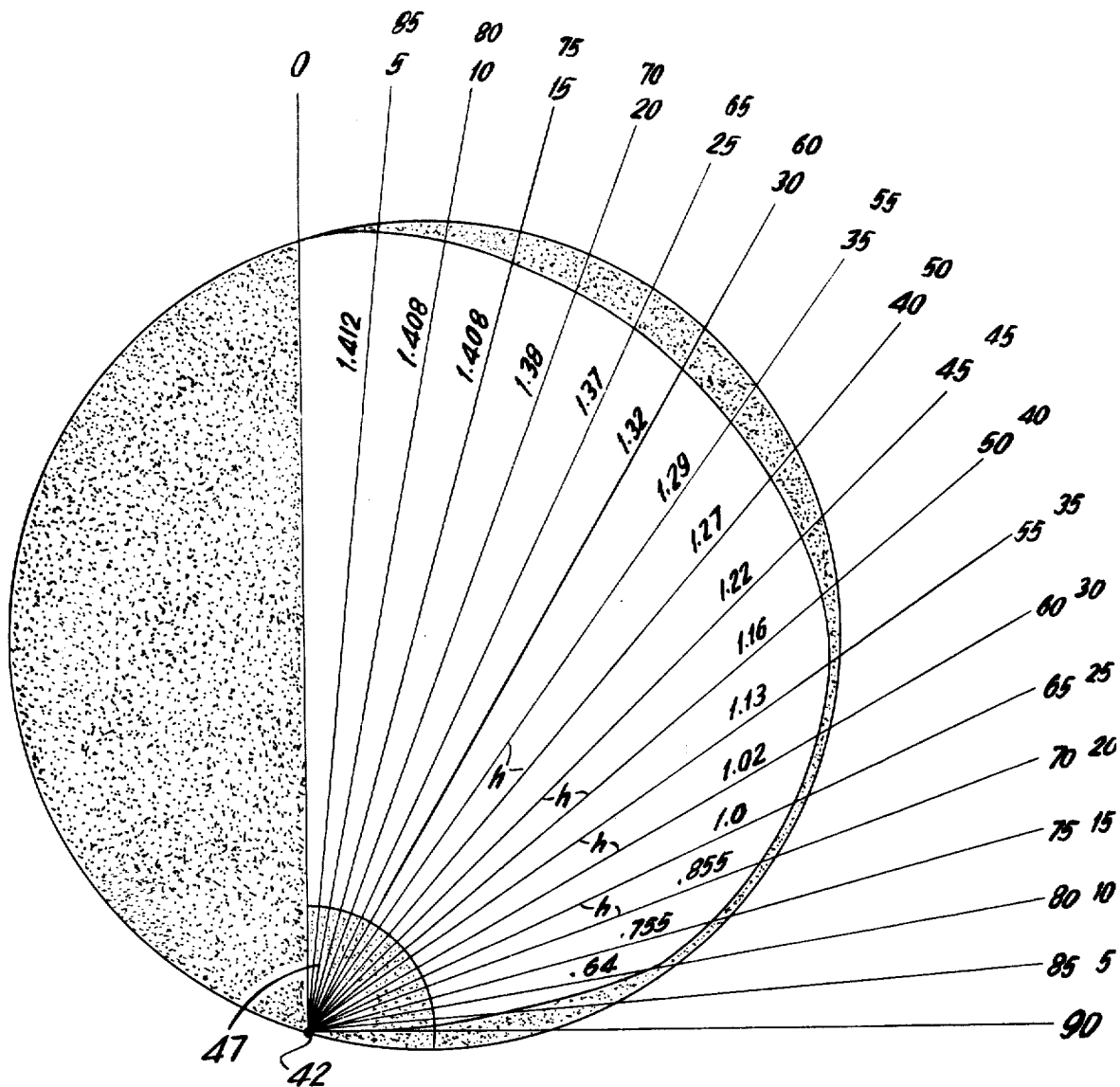
FIG. 5 is a diagram of a round light sensitive cell showing area plots in units of 5°.

In FIG. 5 is shown a diagram for means of computing the shape of the area of the cells 23, 24, 33, 34. Such areas may be marked off on a circular cell, or a cell itself of the shape set forth, may be provided. A series of cells having cumulative sine and co-sine responses, is also considered within the scope of the invention and the cell shape of FIG. 5 is considered exemplary.

For the purpose of FIG. 5, it is assumed that sufficient accuracy is obtainable in calculating a series of altitudes h, which are also roughly equivalent to radii from the pivot point 42. So that proper area exposure can be had in proportion to the sine or co-sine function, a series of triangles are constructed according to the following formula. Sine 5° equals $b/h$ where each triangle is a 5° triangle. $b = 0.087h$, 0.087 having the sine of 5°. Since the exposed area is a cumulative of each of the 5° triangles, the $h$ to be computed and plotted from point 42, is the $h$ in a triangle having a differential area A, equal to the difference of the sine functions of each of the successive 5° triangles. Using the formula, $\Delta A = \frac{1}{2} bh$, where $A$ equals the difference between two successive 5° triangles, we solve, substituting $0.087h$ for $b$. Thus $\Delta A$ equals $\frac{1}{2}$ $(0.087h)$ times $h$, $h^2$ equals $\Delta(A/0.043)$, $h = \sqrt{\Delta A/0.043}$. Substituting the $\Delta A$ figures from the chart below, $h$ can be solved for each 5° and the shape of the exposed area be substantially defined in relation to the sine or co-sine function of the particular angles. In calculating shape as set forth herein, it may be convenient to use the hypotenuse as the altitude of the triangle, since the height of both the altitude and hypotenuse are about the same. In the chart below, we can see that at 5°, $h$ is approximately 1.412 of unity. In the construction, unity may be any unit determined by the size of the cells 23, 24, 33, 34 employed. The sensitive area thus is the area between point 42 and the ends of each of the altitude $h$, exclusive of the shaded area 47, where the periphery is defined by a series of lines joining each of the altitudes $h$ to form the peripheral extremity of the light-sensitive area of each cell 23, 24, 33, 34. The shaded area 47 in each 5° triangle is usually insufficient to effect the overall result as is any minor differential in area caused by rounding out the periphery of the light-sensitive area of each of the bases $b$ of the 5° triangles.

| Angle | Sine of Angle | ΔA | Calculated Radius |
|---|---|---|---|
| 0 | Cumulative Area Required | Additional | r = h |
| 5° | .087 | .087 | 1.412 |
| 10° | .174 | .086 | 1.408 |
| 15° | .259 | .085 | 1.402 |
| 20° | .342 | .083 | 1.38 |
| 25° | .424 | .082 | 1.37 |
| 30° | .500 | .076 | 1.32 |
| 34+ | .572 | .072 | 1.29 |
| 40° | .642 | .070 | 1.27 |
| 45° | .707 | .065 | 1.22 |
| 50° | .765 | .058 | 1.16 |
| 55° | .820 | .055 | 1.13 |
| 60° | .865 | .045 | 1.02 |
| 65° | .908 | .043 | 1.0 |
| 70° | .940 | .032 | .855 |
| 75° | .965 | .025 | .755 |
| 80° | .983 | .018 | .64 |
| 85° | .99 | .007 | .4 |
| 95° | 1.0 | .001 | |

Thus, the shape as calculated in FIG. 5 as applied to the north cell 23, slopes as shown in FIG. 9 as the cell is exposed, starting from a heading of 270° and increasing to a heading of 360°. The closer to the 360°, the smaller the increase of the exposed area for each 5°. From a heading of 0°, increasing to a heading of 90°, the north cell 23 is fully exposed, having a value of +1 and the south cell 24 begins to be exposed on a slope as shown in FIG. 9. The value of the exposed area of the south cell 24 being a negative subtracted is substracted from the value of the exposed area of the north cell 23, on a slope as shown in FIG. 5, until the net value diminishes to 0 when both north and sourth cells 23, 24 are fully exposed at a heading of 90°.

The easting computer 30 in FIG. 3 follows a similar pattern as the northing computer 20. At a heading of 0°, both east and west cells 33, 34 are occluded. As the heading increases towards 90° the amount of the area of the east cell 33 that is exposed slopes as shown in FIG. 9, until the entire cell is exposed at 90°. From 90° to 180°, the west cell 34 increases according to the slope in FIG. 9 on a curve, until at 180°, the east cell 33 with its plus sign and west cell 34 with its minus sign balance each other out for a value of 0, which is the sine function of 180°. A graph of the functions of exposure is set forth in FIG. 9. FIG. 9 is a graph of angle function percentage of exposure of computer light cells for any particular heading H.

The error introduced by the shaded portion 47 extending from the pivot point in each binnacle 40 is presumed negligible insofar as the accuracy of the computation, though it is conceivable that under the circumstances, the $\Delta A$ might warrant an accurate computation of this particular area.

As shown in FIG. 1, a cable 11 may be taken off an odometer (not shown), and used as an input to generator 12. The output of the generator 12 leads to two intensity variable lights 13, as shown, each going to the individual northing and easting computers 20, 30. For convenience, mirrors 14 direct the rays from the light 13 to the binnacles 40. Where the intensity of the light is in proportion to the speed of the vehicle or vessel, the light intensity provides the velocity factor V for the navigational computer 10 and a velocity output drive in a magnitude in proportion to the vehicle or vessel velocity. The light intensity velocity factor then drives each computer servo 50, 55 at the proper angle function times the velocity factor for the northing and easting components of the compass directional heading so that a tracking or plotting may be had on a plotting board or with a fiducial point 68, which represents actual heading and velocity in accordance with the selected scale of a map 61, for instance.

Figure 6:
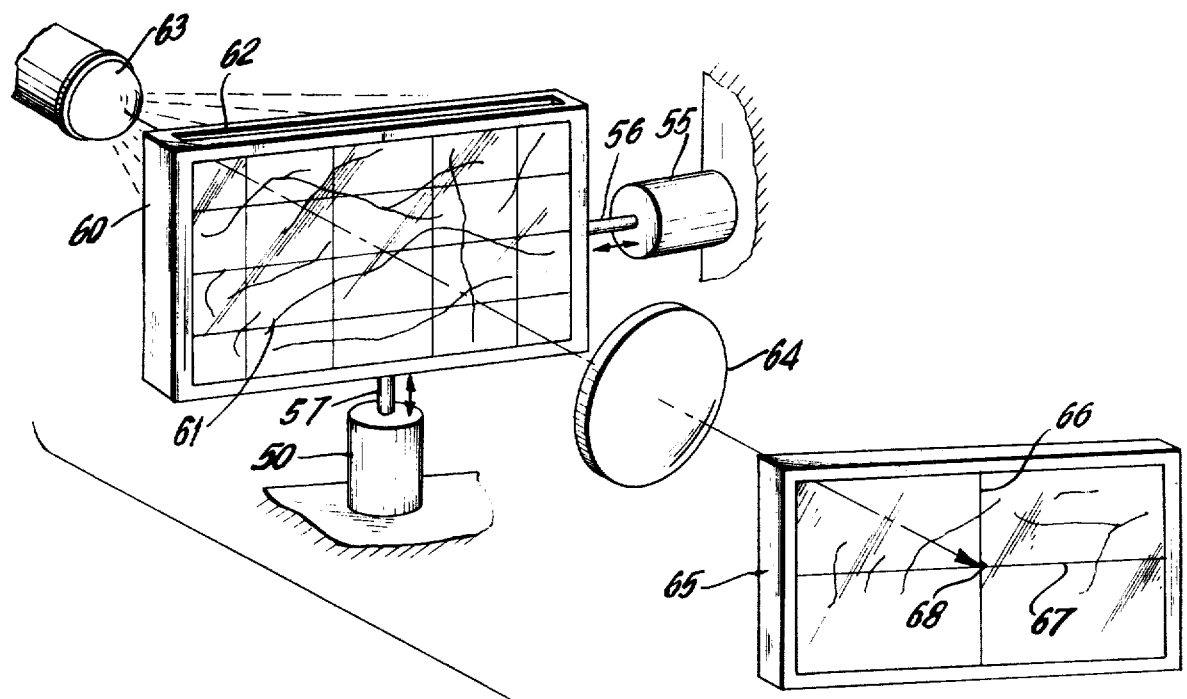
FIG. 6 is a navigational computer of the present invention employing a transparent projection system.

As shown in FIG. 6, the northing servo 50 is connected to a frame 60, as is the easting servo 55. Internal of the frame 60 is transparent map 61, which may be placed into the frame through a slot 62. A conventional projector light 63 projects the map transparency 61 through a lens system 64 and on to a screen 65, preferably including cursors 66 and 67, crossing at a fiducial point 68, which preferably represents the positional location of the vehicle or vessel, as the case may be.

While various forms of orthogonal drives may be used, the servos 50, 55, as exemplified in FIG. 6, are adapted to worm drives (not shown) with the end of the drive shafts having collars in slots in the frame 60, so that the shafts 56, 57 may drive the frame 60 unimpeded, yet leave the frame unimpeded from orthogonal movement from the other servo.

Figure 7:
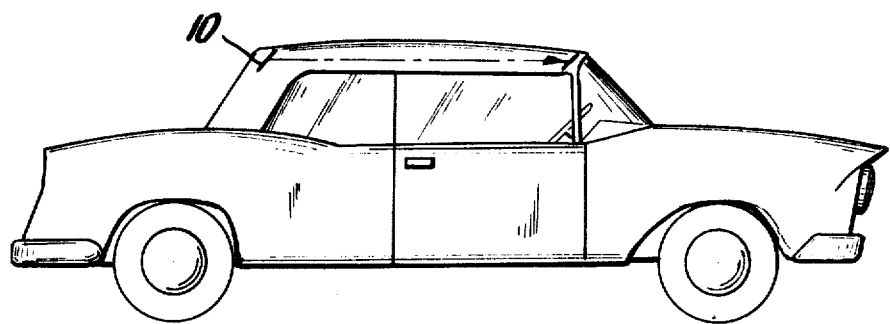
FIG. 7 is a schematic of FIG. 6 projected from rear to front in an automobile.

FIG. 7 shows a simple schematic of the navigational computer 10 of the present invention, projecting from the rear seat to a screen above the driver's seat.

In FIG. 8, a mirror 70 is shown inside a dashboard 71, reflecting a projected map 60 onto a translucent screen 72 on the dashboard 71.

The computer 71 is a composite single binnacle 74 computer 76, having a north-seeking disc 76 with an occluded portion 77.

The easting portion 78 of the computer 73 comprises a west cell 79 in the second quadrant and an east cell in the third quadrant. The east cell 80 and west cell 79 are shaped so that as between themselves, they will give an output to the angle function of the east-west angle as the light 13 passes through the unoccluded portion 81 of the north-seeking disc 76.

The third quadrant also includes a south cell 82. The south cell without interference with the east cell 80 has a different shape. The shape, though, still in proportion to the angle function of its corresponding angle as related to the N cell 83 in the quadrant which is shaped as the west cell 79 and east cell 80 are shaped.

Figure 11:
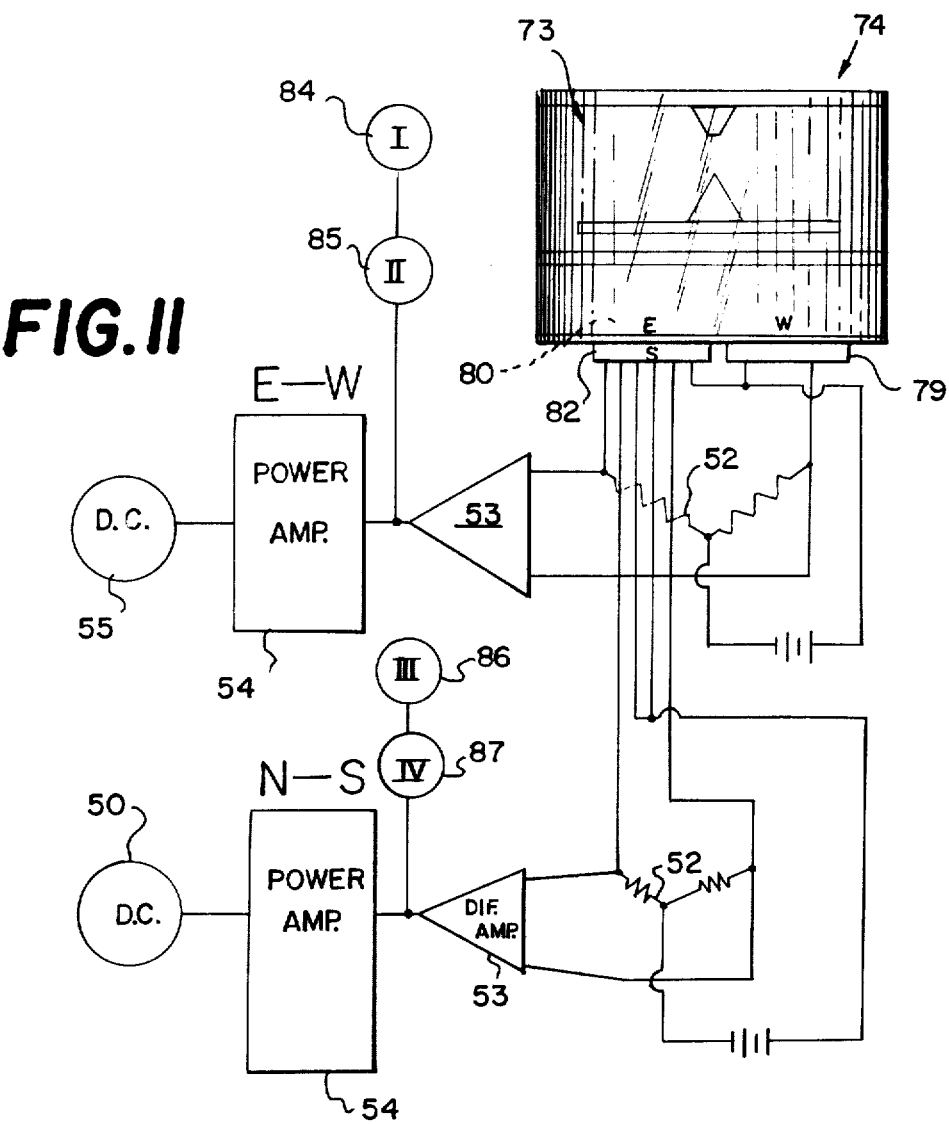
FIG. 11 is a schematic of an embodiment of the navigational computer of the present invention.

In FIG. 11 the binnacle 74 of the computer 73 is shown with circuitry to provide the orthogonal driver servo 50, 55. The circuitry is the same as heretofore described with regard to FIG. 1.

Figure 13:
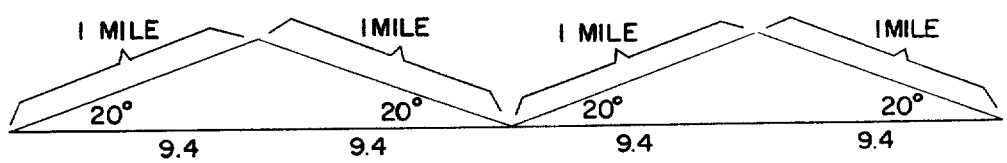
FIG. 13 is a diagram of a particular grade error.

It may be desirable to be able to compensate for errors which may creep into the accuracy of the computer of the present invention as the result of going up and down hills or extremely rough terrain. A grade-compensating computer may be used in series with the computer. The commulative average error introduced because of grading is proportional to the co-sine of the average angle of grade. For example, if the vehicle were traveling along a series of up and down 20° grades, the average error would be equal to six per cent cumulative error, as shown in FIG. 13.

$$\begin{matrix} 9.4 \\ 9.4 \\ 9.4 \\ 9.4 \\ 3.76 \end{matrix} \quad \frac{4p - 3.76}{40} = \frac{.24}{40} \text{---} 6\% \text{ error}$$

If a vehicle is traveling up and/or down grades on a straight tract, the approximate error introduced is shown by the following table:

| AVERAGE GRADE | PER CENT ERROR |
|---|---|
| 5° | .4 |
| 10° | 1.5 |
| 15° | 3.0 |
| 20° | 6.0 |
| 30° | 13.0 |
| 40° | 23.0 |

Figure 12:
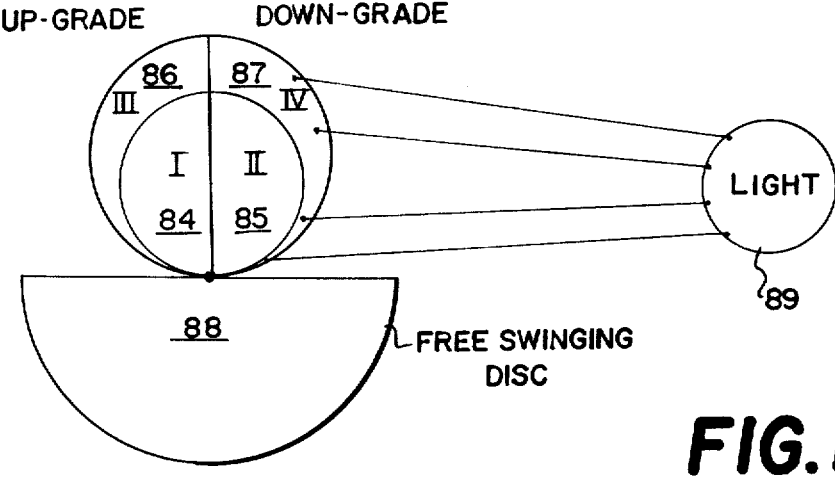
FIG. 12 is an isometric of an error-correcting device of the present invention.

In order to adjust for the error, a device as shown in FIG. 12 can be used.

Four photoresistors 84, 85, 86, 87, constructed in angle function proportional shapes as the light cells 23, 24, 33, 34, 79, 80, 82, 83. A free swinging suspended opaque half disc 88, acting as a mask covers the active areas of either the uphill or downhill cells as per the following formula:

% Area covered = (1 = cos $\theta$) 100
where $\theta$ is the angle of incline
For example: AT $\theta$ = 10°
Area covered = (1 − 0.985) 100 = 1.5% leaving a remaining exposed area of 98.5%

Therefore, the resistors in the circuit would be increased 1.5%.

Both sets of cells are wired in series as in FIG. 11.

Cells 84, 86 are up-grade cells; cells 85 and 87 are down-grade cells. A light 89 of constant intensity illuminates the cells 84, 85, 86 87. The light playing on the cells 84, 85, 86, 87 does not have to vary with the speed as the other cells, since the climbing and descending factors are not relative to speed.

In FIG. 11 the cells 84, 85, 86, 87 are shown in series with the outputs of the differential amplifiers 53 so that the net resistance of up-grade or down-grade will slow the servos 50, 55, correcting the ground distance gain on the map 61 or other output.

The computer 90, as partially shown in FIG. 14 may use one north-seeking disc 91 as shown in FIG. 15. The circuitry is substantially similar to the circuit of FIG. 1 with a bridge 92, a differential amplifier 53, a power amplifier 54 and a servo 55.

A signal generator 93 is responsive to the velocity of a vehicle (not shown) and may be run off an odometer cable (not shown). The signal from the signal generator 93 goes into the same multiplier 94 that receives the signal from the differential amplifier 53.

Light to actuate the photo detector cells 95, 96 as shown, is provided by solid state light emitters 97, 98. The light may, as shown, be funneled through fibre optic guides 99, 100 and concentrated at lenses 101, 102, which are preferably slits.

Light passes through the north-seeking disc 91 from the lenses 101, 102 to the lenses 103, 104 through the fibre optic guides 105, 106 to the east and west photo detectors 95, 96.

As can be seen in FIG. 15, the north-seeking disc 91 has two tracks 107, 108, each occluded in gradations equal to the selected angle functions.

It can be seen that with the north and south lenses 109, 110, fibre optic (not shown) and light emitters (not shown), the north-seeking disc 91 with tracks 107, 108 can provide a simple mode of using one north-seeking disc 91 for all four direction angle functions.

By using the signal generator 93 fed into a multiplier 94, the plate detectors 95, 96 and the north and south photo detectors (not shown) receive an unmodulated light and need only respond to the occlusion in proportion to angle function. The output from the multiplier 94 is a completely integrated signal for the easting computer, as shown in FIG. 14, to the servo 55.

FIG. 16 is an enlarged detail of a portion of another track 107 shown a typical form of occluding configuration.

Figure 17:
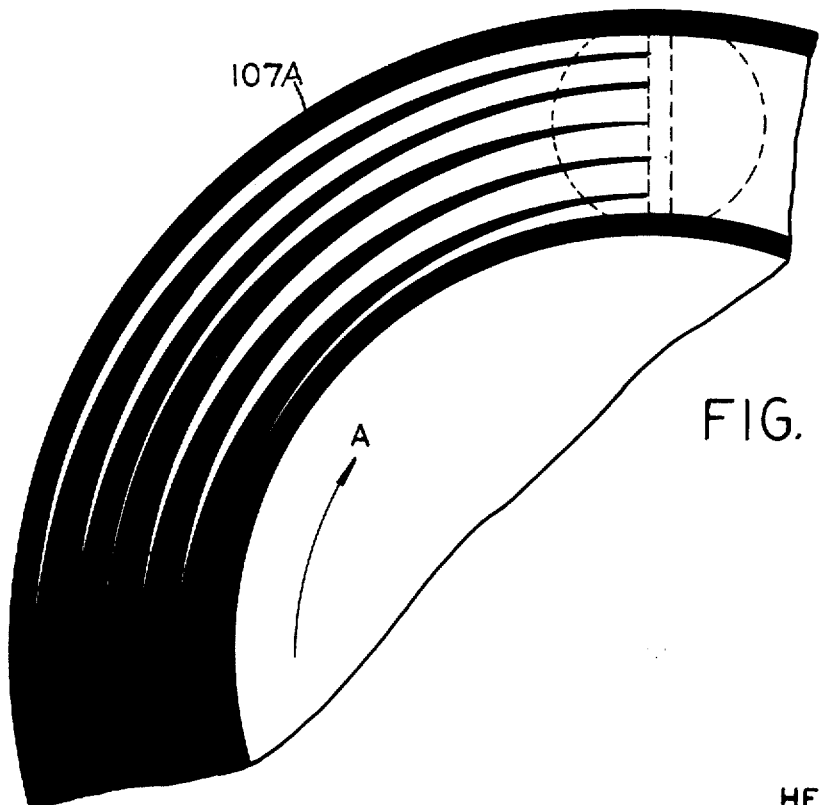
FIG. 17 is a detail of one form of occluding lines for another north seeking disc.

FIG. 17 shows a track 1072 occluded by one occluding configuration proceeding in the direction of the arrow A from total occlusion to no occlusion.

Figure 18:
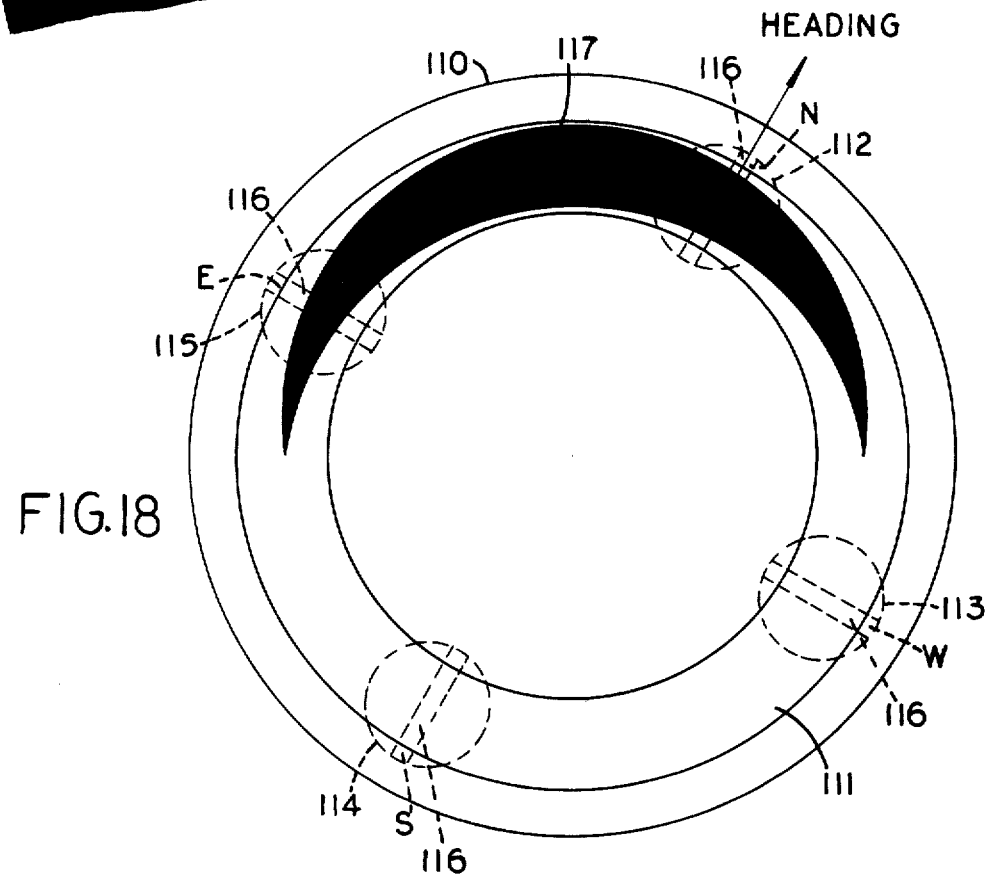
FIG. 18 is a detail plan view of single track northing and easting north seeking discs.

In FIG. 18 a north-seeking disc 110 is provided with a sinle track 111. Below the track are lenses 112, 113, 114, 115 for the north, west, south and east cells (not shown) each having a slit 116 leading to a photo detector cell (not shown). In this embodiment, the west lens 116 and cell and east lens 116 and cell are reversed to correspond to the integrated occulsion shape 117 which has the simultaneous functions for the north, south, east and west vectors all on the same track 111.

Figure 19:
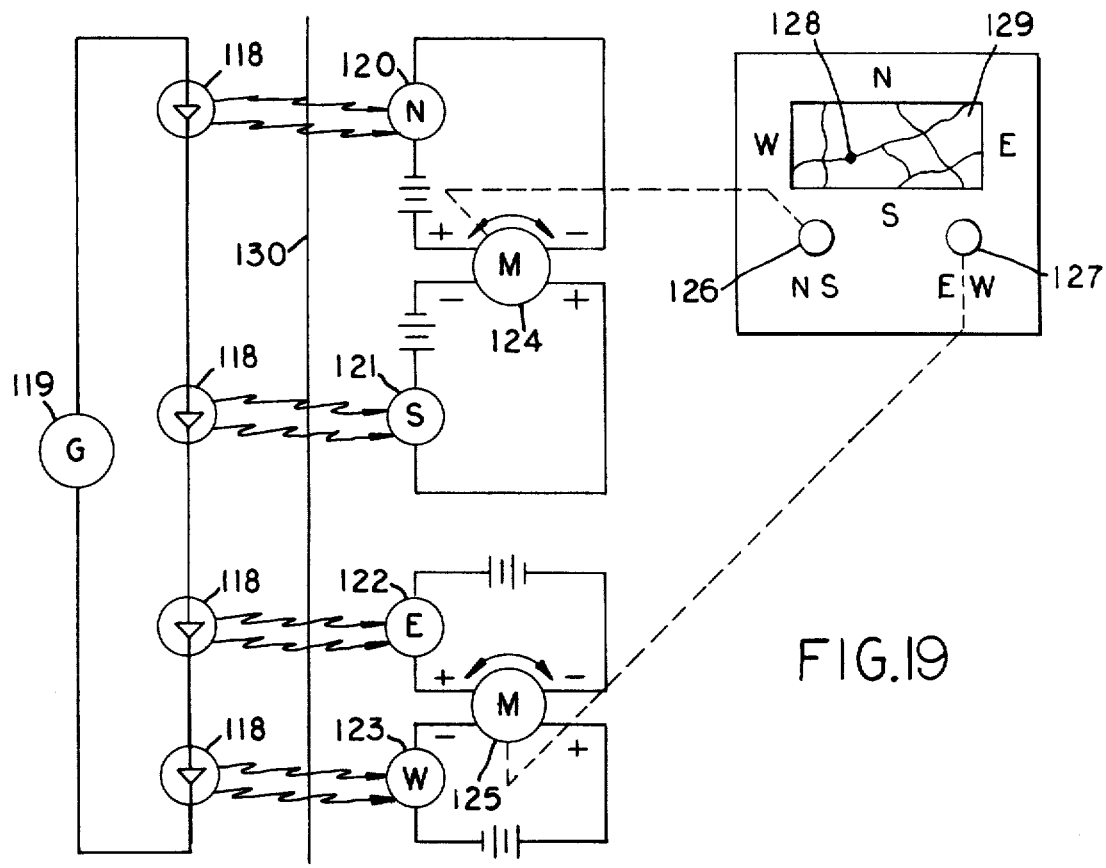
FIG. 19 is a schematic of a form of tracking drive of the present invention.

In FIG. 19, a schematic of a variant of the drive system of the present invention is shown.

Light emitters 118 are in a circuit with a variable signal generator 119 whose output may be geared to an odometer cable (not shown) or even a tachometer.

Light emissions are received by the photo detector cells 120, 121, 122, 123 representing the north, south, east and west vectors respectively. The photo detector cells 120, 121 are in separate circuits with a reversible motor 124 as are the photo detector cells 118, 119 with reversible motor 125.

The motor 124 is linked to an orthogonal drive 126 for north and south vectors and the motor 125 is linked to the orthogonal drive 127 for the east and west vectors. The drives 126, 127 drive a fiducial point 128 over a displayed map 129, the drives being modulated as to velocity by the output of the signal generator 119 and the north, south, east and west drives being modulated by the occlusions on the north-seeking disc 130 as it rotates.

The terms and expressions which are employed are used as terms of description; it is recognized, though, that various modifications are possible.

Having thus described certain forms of the invention in some detail, what is claimed is:

1. A navigational computer comprising a housing including a rotatable north-seeking indicator, at least one light source, at least two light sensitive means, said at least one light source adapted to illuminate said at least two light sensitive means; means associated with said north-seeking indicator to occlude and expose during rotation said light sensitive means as said housing moves about said north-seeking indicator in proportion to a series of non-linear angle functions corresponding to directional headings, and said light sensitive means in fixed position.

2. The invention of claim 1 wherein said angle functions are selected sine and co-sine functions.

3. The invention of claim 1 wherein said north-seeking indicator is a magnetic device.

4. The invention of claim 1 wherein said means associated with said north-seeking indicator to occlude said light sensitive means is an opaque area rotatable with said north-seeking indicator.

5. The invention of claim 1 wherein said housing includes a transparent portion between said north-seeking indicator and said light sensitive means.

6. The invention of claim 1 including a light adapted to illuminate said housing with said north-seeking indicator spaced between said light and said light sensitive means.

7. The invention of claim 1 wherein at least two of said light sensitive cells are electrically connected to a differential amplifier, the output of said differential amplifier being equal to the angle function of the unocclusion of said at least two cells.

8. The invention of claim 7 wherein said cells are connected to a differential circuit whose output is adapted to actuate a servo motor.

9. The invention of claim 6 wherein said light is adapted to be varied in intensity proportional to a selected velocity tracked.

10. The invention of claim 1 wherein at least two light sensitive cells are connected to a differential circuit and adapted to actuate a servo motor.

11. The invention of claim 10 wherein said servo motors actuate at least one orthogonal indicia.

12. The invention of claim 11 in combination with a map transparency, means to project said map transparency, said map transparency adapted to be driven by at least one servo motor in proportion to a selected velocity tracked.

13. The invention of claim 12 including a screen, said screen including a fiducial point.

14. The invention of claim 13 including a mirror adapted to change the direction of the map projection.

15. The invention of claim 14 wherein said map is projected upon a translucent screen.

16. The invention of claim 1 including more than one light-sensitive cell in the same portion of the housing.

17. The invention of claim 7 including a least one pair of light-sensitive cells, said pair of light-sensitive cells shaped in proportion to selected angle functions, a rotatable down-seeking mask adapted to occlude said at least one pair of cells upon upward or downward positioning, a constant light source playing on said at least one pair of cells, the output of at least one pair of cells connected in series with the output of said differential circuit, said at least one pair of cells when occluded acting as a resistance to the output of said differential circuit.

18. The invention of claim 17 wherein said mask is an opaque half disc freely suspended adjacent said at least one pair of light cells.

19. The invention of claim 2 wherein said at least two light-sensitive means are shaped in proportion to the same angle function one said light-sensitive means being electrically positive, the other said light-sensitive means equally electrically negative.

20. The invention of claim 1 wherein said light-sensitive means have shaped areas and said means associated with said north-seeking indicator leave exposed areas of non-linear angle functions shaped areas proportional to directional headings.

21. The invention of claim 1 wherein said means associated with said north-seeking indicator to occlude and expose said light-sensitive means comprises at least one track having at least one occluded area.

22. The invention of claim 1 wherein said means associated with said north-seeking indicator to occlude and expose said light-sensitive means comprises one track having one occluded area.

* * * * *